June 13, 1933. W. A. WHITE 1,913,577
PULVERIZED FUEL COMBUSTION APPARATUS
Filed Sept. 8, 1931
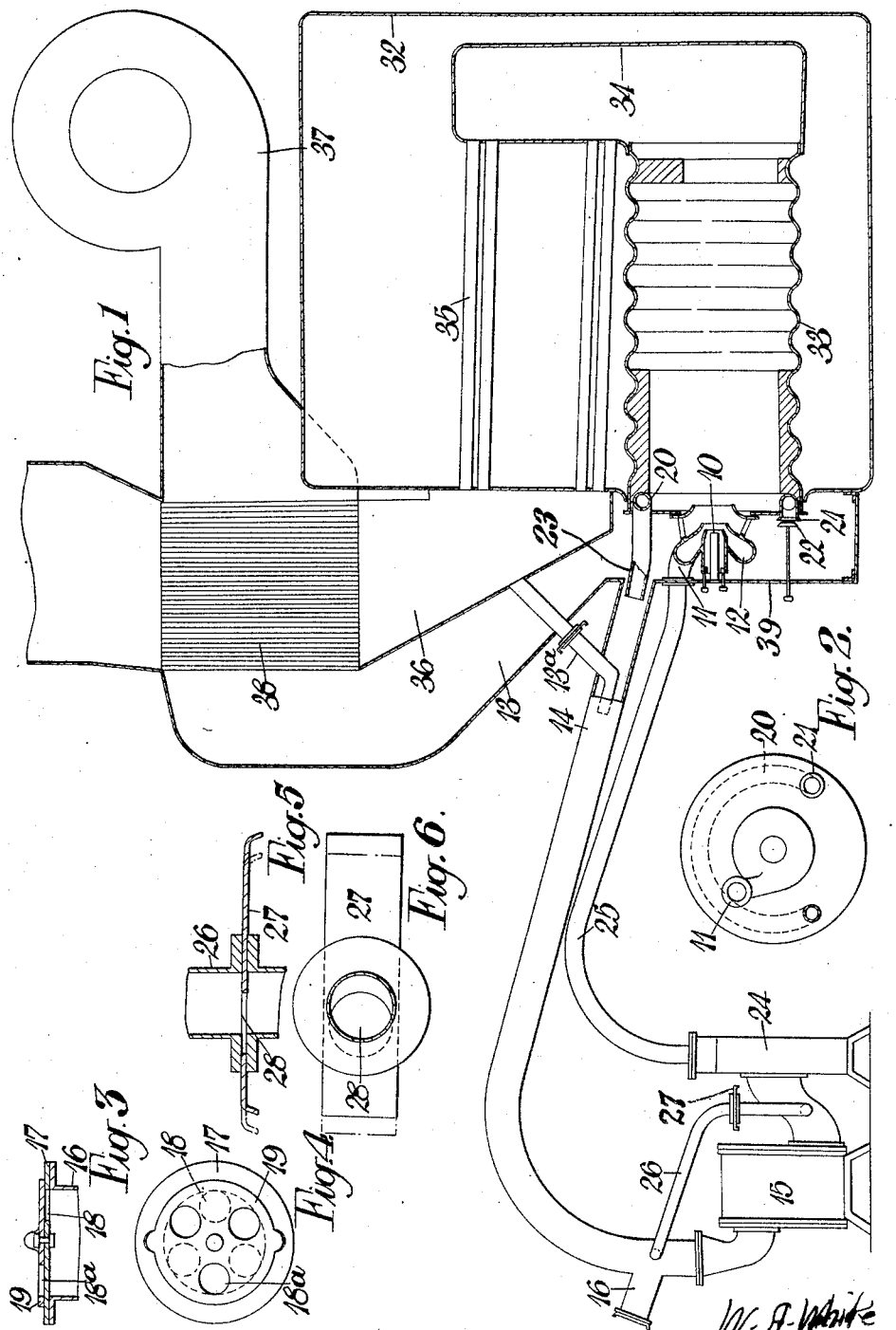

Patented June 13, 1933

1,913,577

UNITED STATES PATENT OFFICE

WILLIAM ALBERT WHITE, OF HEBBURN-ON-TYNE, ENGLAND, ASSIGNOR TO WHITE'S MARINE ENGINEERING COMPANY, LIMITED, OF HEBBURN-ON-TYNE, ENGLAND

PULVERIZED FUEL COMBUSTION APPARATUS

Application filed September 8, 1931, Serial No. 561,774, and in Great Britain September 11, 1930.

This invention relates to pulverized fuel combustion apparatus and more specifically to furnace fronts and burners therefor and means for regulating the amount and temperature of the combustion air.

The invention is applicable though not restricted to the combustion of pulverized fuel such as coal, the main object being to provide a simple and improved construction adapted to ensure complete combustion; another object is to provide improved means for heating and for regulating the amount and temperature of combustion air.

With these objects in view the invention consists in the features hereinafter described and claimed in the appended claims.

Referring to the accompanying diagrammatic drawings:—

Figure 1 shows the general arrangement of a steam-generating plant operating with pulverized fuel in accordance with the invention;

Figure 2 shows an elevation of the furnace front;

Figures 3 and 4 show sectional elevation and plan respectively of a form of rotary regulator; while finally Figures 5 and 6 show similar views of a form of sliding regulator.

In carrying the invention into effect according to the form illustrated in Figure 1 as applied to a steam generator, 32, having a furnace flue, 33, combustion chamber, 34, return tubes, 35, and smoke-box, 36, air is forced by a fan, 37, through a preheater, 38, of any usual or suitable construction arranged in the uptake, a part of the air so heated passing into the furnace front, 39, to provide secondary combustion air for the pulverized fuel, e. g., coal, which is burned by help of a burner, 10, of any suitable type.

This burner is preferably of the type comprising a tangential inlet, 11, for the pulverized fuel and primary air, (see also Figure 2) leading to an annulus, 12, of pear-shaped cross-section, the mixture of pulverized fuel issuing from its small end being sandwiched between inner and outer supplies of secondary air, which can be regulated as desired.

From the duct, 13, leading preheated air to the furnace front 39, a branch, 14, passes to the pulverizer, 15, this branch being provided with a controllable inlet, 16, for cold air.

Any suitable regulating device may be used for this purpose, a convenient form being shown in Figures 3 and 4. This device comprises a stationary disc, 17, secured to the inlet, 16, and provided with spaced apertures, 18, and pivoted centrally on this disc, a second disc, 19, provided with similar apertures, 18a, which can be brought by a rotary movement into correspondence to any desired extent with the apertures, 18.

In some cases, a connecting pipe, 13a, preferably controllable, may pass from the smokebox, 36, to the pipe, 14, the object of this connection being to lead high-temperature gases from the smoke-box into the air stream to the pulverizer in order, for example, to assist in drying excessively wet fuel.

At the mouth of the furnace flue, 33, a length of tube, 20, or a box-like structure of equivalent functions, curved to fit within it over any desired arc of the circumference is exposed to the radiant heat of the furnace so as to constitute a high-temperature heater, air being admitted to this tube by a bell-mouthed inlet, 21, suitably controlled, as by valve, 22, and discharging by way of the pipe, 23, into the branch, 14, above mentioned leading to the pulverizer, 15.

The tube, 20, or equivalent, may be provided with fins or ribs, if desired, in order to increase its heating effect.

The pulverizer is provided with a fan, 24, drawing the mixture of pulverized fuel and primary combustion air therefrom and discharging it through the pipe, 25, to the burner itself, while finally a by-pass, 26, is provided leading to the fan inlet from the branch pipe, 14, and short-circuiting the pulverizer, 15, this by-pass being also controllable for example, by the shutter regulator shown in Figures 5 and 6, in which a slide, 27, is provided, having a circular aperture, 28, which can be brought into any desired position in relation to the bore of the by-pass.

The adjustable by-pass, 26, plays an important part in regulating the speed of the air through the pulverizer, and in consequence the degree of fineness of the pulverization.

By means of the present invention, both the temperature and quantity of the primary combustion air can be regulated with any degree of accuracy required, four separate means of regulation being provided, namely, (a) a control for the air heated in tube, 20, by the radiant heat of the furnace; (b) a controllable supply of cold air to inlet, 16; (c) a controllable by-pass, 26, from the pulverizer inlet to the fan inlet, and (d) a controllable supply of high temperature gases from the smoke-box to pipe, 14.

The form of the invention described above includes all the controls specified, but depending on the requirements of a particular design, the installation may be simplified, if desired, by the omission of one or more of these.

It will be seen in addition that the nature of the component parts of the installation, e. g., the high-temperature heater, may take many different forms without exceeding the scope of the invention.

Having now described my invention, what I claim as new and desire to secure by Letters Patent is:—

1. A pulverized fuel installation for steam generators comprising a steam generator having a combustion space, a burner positioned at the mouth of said space, a furnace front surrounding said burner, a preheater positioned to be impinged upon by the flue gases, a trunk connecting the preheater and the furnace front, a pulverizer having an intake and an outlet, a fan having an inlet and an outlet, a trunk connecting the outlet of the pulverizer to the inlet of the fan, an air trunk connecting the furnace front with the intake of the pulverizer, and a trunk connecting the outlet of said fan to the burner.

2. A pulverized fuel installation for steam generators comprising a steam generator having a combustion space, a burner positioned at the mouth of said space, a furnace front surrounding said burner, a preheater positioned to be impinged upon by the flue gases, a trunk connecting the preheater and the furnace front, a pulverizer having an intake and an outlet, a fan having an inlet and an outlet, a trunk connecting the outlet of the pulverizer to the inlet of the fan, an air trunk connecting the furnace front with the intake of the pulverizer, and a trunk connecting the outlet of said fan to the burner, an air heating tube positioned in the mouth of the combustion space, means for controlling the flow of air from the furnace front through said tube and means for delivering the air from the air heating tube to the air trunk connecting the furnace front with the intake of the pulverizer.

3. A pulverized fuel installation for steam generators comprising a steam generator having a combustion space, a burner positioned at the mouth of said space, a furnace front surrounding said burner, a preheater positioned to be impinged upon by the flue gases, a trunk connecting the preheater and the furnace front, a pulverizer having an intake and an outlet, a fan having an inlet and an outlet, a trunk connecting the outlet of the pulverizer to the inlet of the fan, an air trunk connecting the furnace front with the intake of the pulverizer, a trunk connecting the outlet of said fan to the burner, a pipe adapted to lead the furnace gases to the air trunk connecting the furnace front with the intake of the pulverizer and means for controlling the volume of said gases.

4. A pulverized fuel installation for steam generators comprising a steam generator having a combustion space, a burner positioned at the mouth of said space, a furnace front surrounding said burner, a preheater positioned to be impinged upon by the flue gases, a trunk connecting the preheater and the furnace front, a pulverizer having an intake and an outlet, a fan having an inlet and an outlet, a trunk connecting the outlet of the pulverizer to the inlet of the fan, an air trunk connecting the furnace front with the intake of the pulverizer, a trunk connecting the outlet of said fan to the burner, a tube connecting the intake of the pulverizer with the outlet thereof, and means for controlling the air by-passed through said tube.

5. A pulverized fuel installation for steam generators comprising a steam generator having a combustion space, a burner positioned at the mouth of said space, a furnace front surrounding said burner, a preheater positioned to be impinged upon by the flue gases, a trunk connecting the preheater and the furnace front, a pulverizer having an intake and an outlet, a fan having an inlet and an outlet, a trunk connecting the outlet of the pulverizer to the inlet of the fan, an air trunk connecting the furnace front with the intake of the pulverizer, a trunk connecting the outlet of said fan to the burner, an extra air inlet for the admission of cold air positioned in the air trunk connecting the furnace front with the intake of the pulverizer and adjacent said intake, and means for controlling the flow of air through said extra air inlet.

In testimony whereof I have signed my name to this specification.

WILLIAM ALBERT WHITE.